(12) United States Patent
Goldstein

(10) Patent No.: US 10,399,508 B2
(45) Date of Patent: Sep. 3, 2019

(54) HAND-HELD DEVICE HOLDER

(71) Applicant: GO-VUU LLC, Bluffton, SC (US)

(72) Inventor: Larry Goldstein, Hardeeville, SC (US)

(73) Assignee: GO-VUU LLC, Bluffton, SC (US)

( * ) Notice: Subject to any disclaimer, the term of this patent is extended or adjusted under 35 U.S.C. 154(b) by 10 days.

(21) Appl. No.: 15/752,109

(22) PCT Filed: Aug. 18, 2016

(86) PCT No.: PCT/US2016/047557
§ 371 (c)(1),
(2) Date: Feb. 12, 2018

(87) PCT Pub. No.: WO2017/031320
PCT Pub. Date: Feb. 23, 2017

(65) Prior Publication Data
US 2019/0193645 A1    Jun. 27, 2019

Related U.S. Application Data

(60) Provisional application No. 62/207,045, filed on Aug. 19, 2015.

(51) Int. Cl.
*H04M 1/00*  (2006.01)
*B60R 11/02* (2006.01)
*B60R 11/00* (2006.01)

(52) U.S. Cl.
CPC ..... *B60R 11/0241* (2013.01); *B60R 2011/001* (2013.01); *B60R 2011/0059* (2013.01); *B60R 2011/0063* (2013.01)

(58) Field of Classification Search
CPC ..... B60R 2011/0005; B60R 2011/0075; B60R 2325/205; B60R 25/02; B60R 11/0241; B60R 2011/001; B60R 2011/0059; B60R 2011/0063
See application file for complete search history.

(56) References Cited

U.S. PATENT DOCUMENTS

| | | |
|---|---|---|
| 5,697,071 A | 12/1997 | Fan |
| 6,149,116 A | 11/2000 | Won |
| 6,328,271 B1 | 12/2001 | Haage et al. |
| 7,594,631 B1 | 9/2009 | Carnevali |
| 8,496,144 B2 | 7/2013 | Son |
| 2007/0029359 A1 | 2/2007 | Smith |
| 2011/0024470 A1* | 2/2011 | Hajarian ............ B60R 11/0241 224/276 |

(Continued)

FOREIGN PATENT DOCUMENTS

| | | |
|---|---|---|
| DE | 4344079 C1 | 12/1994 |
| DE | 102012024793 A1 | 6/2014 |

(Continued)

OTHER PUBLICATIONS

U.S. Appl. No. 62/207,045, filed Aug. 19, 2015, Larry Goldstein.
(Continued)

*Primary Examiner* — Nhan T Le
(74) *Attorney, Agent, or Firm* — Ballard Spahr, LLP

(57) ABSTRACT

A device for mounting a hand-held device is disclosed. The device providing hands free operation of the hand-held device during a vehicle operation is also disclosed.

17 Claims, 14 Drawing Sheets

(56) References Cited

U.S. PATENT DOCUMENTS

| | | | |
|---|---|---|---|
| 2013/0227848 A1* | 9/2013 | Wilds | B62D 1/00 33/301 |
| 2014/0008405 A1 | 1/2014 | Beaver | |
| 2017/0199094 A1* | 7/2017 | Duff | B62D 5/0457 |
| 2018/0118131 A1* | 5/2018 | Lowell | B60R 11/0241 |

FOREIGN PATENT DOCUMENTS

| | | |
|---|---|---|
| JP | 2001071818 A | 3/2001 |
| SU | 1092081 A1 | 5/1984 |
| WO | PCT/US2016/047557 | 8/2016 |

OTHER PUBLICATIONS

International Search Report and Written Opinion were dated Dec. 8, 2016 by the International Searching Authority for Application No. PCT/US2016/047557, filed Aug. 18, 2016, and published as WO 2017/031320 on Feb. 23, 2017 (Applicant—GO-VUU LLC) (6 pages).

International Preliminary Report on Patentability was dated Feb. 20, 2018 by the International Searching Authority for Application No. PCT/US2016/047557, filed Aug. 18, 2016, and published as WO 2017/031320 on Feb. 23, 2017 (Applicant—GO-VUU LLC) (5 pages).

\* cited by examiner

HAND-HELD DEVICE HOLDER

CROSS-REFERENCE TO RELATED APPLICATIONS

This Application claims the benefit of priority to International Application No. PCT/US2016/47557, filed Aug. 18, 2016, which claims the benefit of U.S. Provisional Application No. 62/207,045, filed on Aug. 19, 2015. The contents of these earlier filed applications are hereby incorporated by reference in their entirety.

FIELD OF INVENTION

This invention relates to devices and methods for mounting and displaying a hand-held device for ease of viewing and hands-free use, particularly for use in vehicles.

BACKGROUND

The rapid development of smart hand-held devices in the last decade demonstrates a great technological success that has brought convenience to users in every aspect of their lives. Today, hand-held devices provide the user with the convenience of all types of communication, including instant cellular phone, email and texting communications, without significantly interrupting the user's routine. However, the continuous use of hand-held devices has also brought safety concerns associated with the use of hand-held devices in situations where the user's attention is required. One of the biggest concerns is that in many situations the hand-held device can interfere with operation of various types of motorized vehicles, where maximum concentration is essential. For example, modern hand-held devices allow a driver to review driving directions and maps and send and receive emails, texts, and phone calls, while operating a vehicle. The use of hand-held devices during vehicle operation can distract the driver and result in accidents. Furthermore, due to the safety concerns associated with the use of hand-held devices during vehicle operation, many countries forbid use of a hand-held device, unless it is operated in a hands-free manner.

Thus, there is a need for devices and methods that provide mounting solutions for hand-held devices and allow for hands-free operation of a hand-held device. The invention is directed to these, as well as other, important needs.

SUMMARY

Described herein, in one aspect, is a device for mounting a hand-held device to a selected substrate comprising: a hand-held device mounting member comprising a first surface and a second surface; a fixation member comprising a third surface and a fourth surface; a fastener; wherein the second surface of the hand-held device mounting member is engagable with the third surface of the fixation member; wherein the fourth surface of the fixation member is configured to mount on the selected substrate; and wherein the hand-held device mounting member is configured to be rotatably coupled with the fixation member by the fastener so that a hand-held device remains in an original position regardless of position of the selected substrate.

In some aspects, the hand-held device mounting member of the described device further comprises: a housing having a mounting surface, an opposed fixation member engaging surface, a first side surface and a second side surface connected to and extending therebetween the mounting surface and the fixation member engaging surface, a first support arm and a second support arm connected to and extending therebetween the mounting surface, wherein the mounting surface, the first support arm, and at least a portion of the first and second side surfaces cooperate to form a first sliding member, the second support arm and a remaining portion of the first and second side surfaces cooperate to form a second sliding member, wherein the first and the second sliding members are configured to slide in opposition to each other relative to a translation axis toward an open position, and wherein the first and the second sliding members are biased toward a closed position; and wherein the support arms and the mounting surface of the housing cooperate to define a receiving area, and wherein the support arms are configured to securely engage a hand-held device positioned within the receiving area.

In certain aspects, further disclosed herein a device for mounting a hand-held device to a substrate comprising: a hand-held device mounting member comprising a first surface, a second surface, a first proximal end and a first distal end, wherein the first surface is opposite to the second surface; a support member comprising a third surface, a fourth surface, a second proximal end and a second distal end; wherein the third surface is opposite to the fourth surface; a fixation member comprising a fifth surface, a sixth surface, a first end and a second end; and wherein the fifth surface is opposite to the sixth surface; wherein a portion of the first proximal end of the hand-held device mounting member is configured to hingeably couple with a portion of the first end of the fixation member; wherein a portion of the second proximal end of the support member is configured to hingeably couple with a portion of the second end of the fixation member, wherein the first and the second end of the fixation member are opposite to each other; wherein the second surface of the a hand-held device mounting member and the fifth surface of the fixation member cooperate to define a first angle, and wherein the first angle is selectively adjustable; wherein the fourth surface of the support member and the fifth surface of the fixation member cooperate to define a second angle, and wherein the second angle is selectively adjustable; wherein a portion the first distal end of the hand-held device mounting member is configured to hingeably couple with a portion of the second distal end of the support member; wherein the second surface of the hand-held device mounting member and the fourth surface of the support member cooperate to define a third angle, and wherein the third angle is selectively adjustable; wherein the first surface of the hand-held device mounting member is configured to receive a hand-held device; wherein the sixth surface of the fixation member is configured to be attached to a selected substrate; and wherein the hand-held device mounting member and the support member have at least one point of contact.

In yet another aspect, described herein is a method comprising: coupling a hand-held device mounting member with a fixation member to allow the hand-held device mounting member and the fixation member to engage in a rotatable configuration; attaching the fixation member with a second attachment member to a selected substrate; mounting a hand-held device on the hand-held device mounting member, wherein the hand-held device remains oriented in its original position independent of rotation or position of the selected substrate.

Also described herein is a method of using the device for mounting a hand-held device comprising: attaching the hand-held device to a steering wheel, or dashboard, or other substrate; mounting a hand-held device; and using, hands-free, the hand-held device while driving.

Additional advantages of the invention will be set forth in part in the description, which follows, and in part will be apparent from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

These and other features of the preferred embodiments of the invention will become more apparent in the detailed description in which reference is made to the appended drawings wherein.

DETAILED DESCRIPTION

Figure 1:
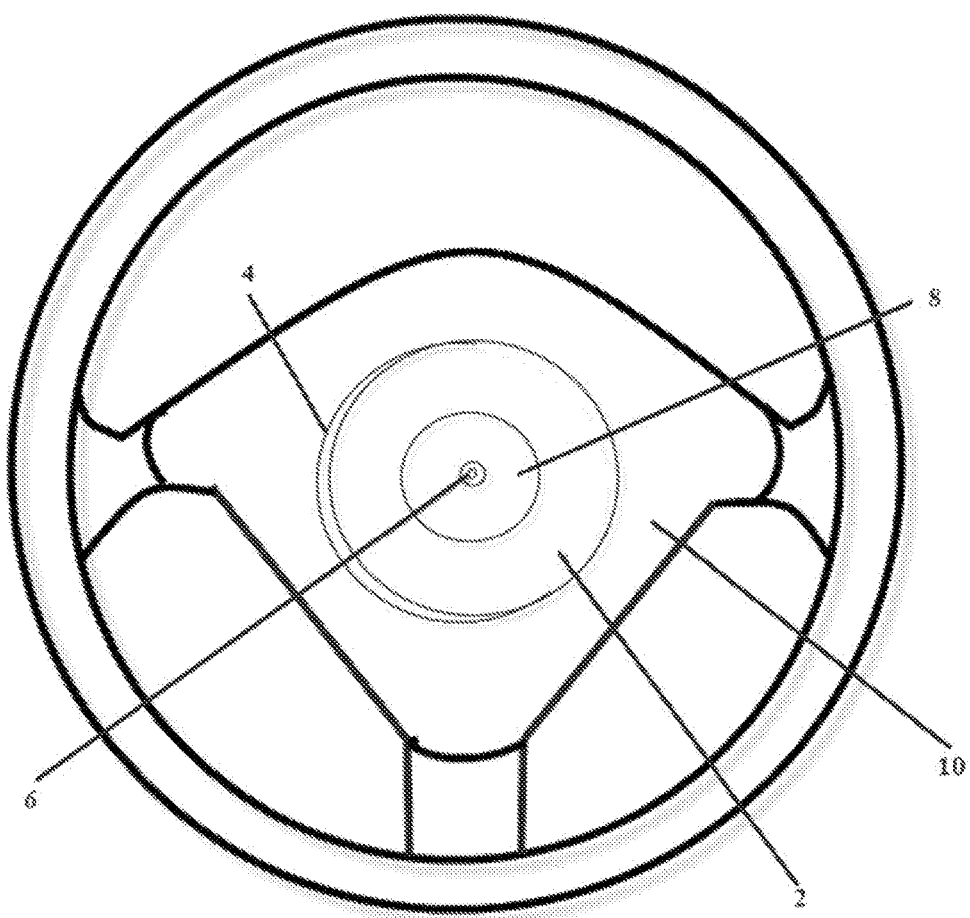
FIG. 1 is a front view of one embodiment of an exemplary device attached to an exemplary substrate.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

A. Definitions

As used throughout, the singular forms "a," "an" and "the" include plural referents unless the context clearly dictates otherwise. Thus, for example, reference to "an actuator" can include two or more such actuators, unless the context indicates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described feature, event or circumstance may or may not occur, and that the description includes instances where said feature, event or circumstance occurs and instances where it does not.

The word "or" as used herein means any one member of a particular list and also includes any combination of members of that list.

B. Hand-Held Device Holder

In one aspect, disclosed herein is a hand-held device mounting member comprising a first surface and a second surface; a fixation member comprising a third surface and a fourth surface; a fastener; wherein the second surface of the hand-held device mounting member is engaged with the third surface of the fixation member, and wherein the hand-held device mounting member is configured to be rotatably coupled with the fixation member by the fastener so that a hand-held device remains in original position regardless of position of the selected substrate. The device can further comprise a first attachment member and a second attachment member. It is further understood that the first and the second attachment members can comprise any materials allowing attachment between any two articles. For example, and without limitation, the attachment member can include hooks-and-loops, hook-and-pile, touch attachment member, a magnetic material, an adhesive, or any combinations thereof. In some aspects, the attachment member can comprise Velcro® fastener. Even further it is understood that the first and second attachment members can have any shape or size. In some aspects, the first and the second attachment member have a size sufficient to ensure a proper attachment. In yet other aspects, the first and the second attachment member can have any shape sufficient to ensure a proper contact between the members or substrates being attached to each other.

It is understood that the disclosed hand-held device mounting member and the fixation member can have a similar or a different shape. For example, the hand-held device mounting member and the fixation member can have any shape allowing rotatable coupling with each other. In some aspects, the hand-held device mounting member and the fixation member can have, for example, and without limitation, an annular, a circular, a triangular, a rhombic, a square, a parallelogram, a trapezoidal, irregular, or any other shape. It is further understood that the hand-held device mounting member can be used as a fixation member. In some examples, the fixation member can be used as hand-held device mounting member.

Figure 4:
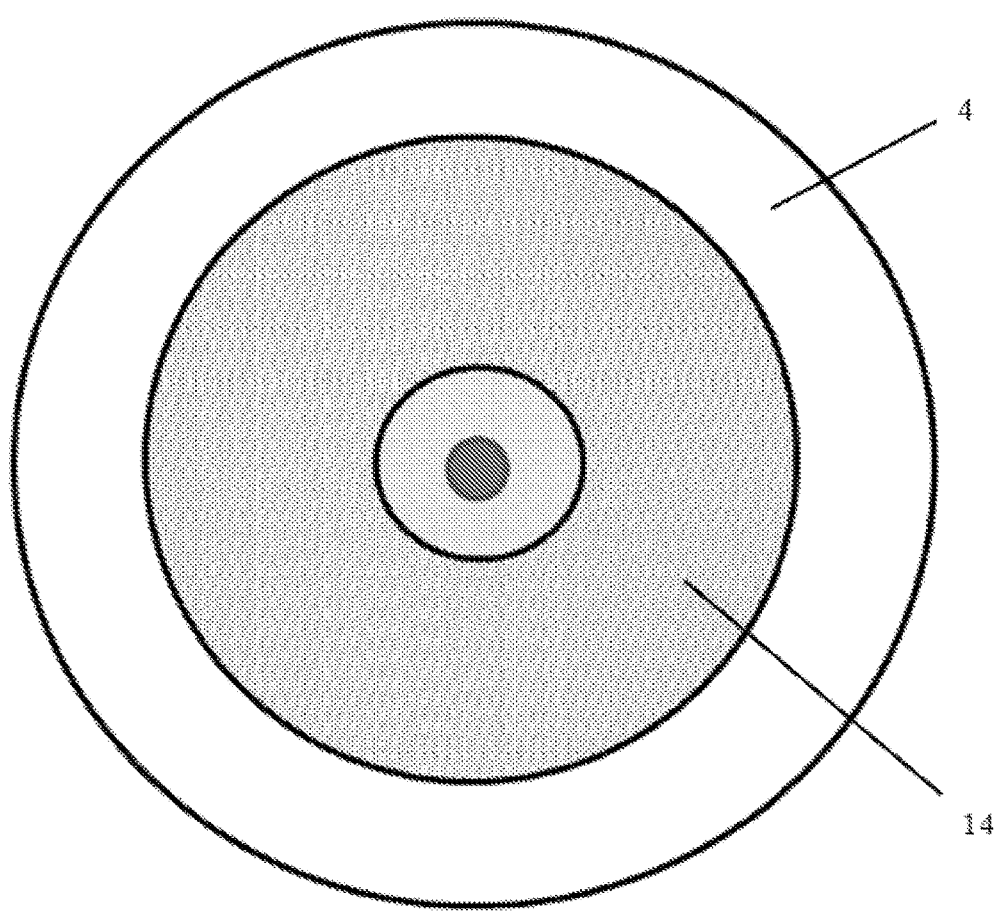
FIG. 4 is an exemplary attachment member coupled with a device disclosed herein in one embodiment.

A first exemplary device as it attached to a selected substrate is demonstrated in FIG. 1. The device comprises a hand-held device mounting member 2 and a fixation member 4 that are coupled by a fastener 6. The first attachment member 8 present in the disclosed device is disposed on the first surface of the hand-held device mounting member 2, and is configured to receive a hand-held device. In some aspects, the hand-held device mounting member 2 and the fixation member 4 can be spaced to provide substantially friction free rotation. The exemplary device can be attached to the selected substrate with the second attachment member. For example, as shown in FIG. 4, the second attachment member 14 disposed on the fourth surface of the fixation member. In some aspects, both the first and the second attachment members can comprise Velcro® fastener.

Figure 2:
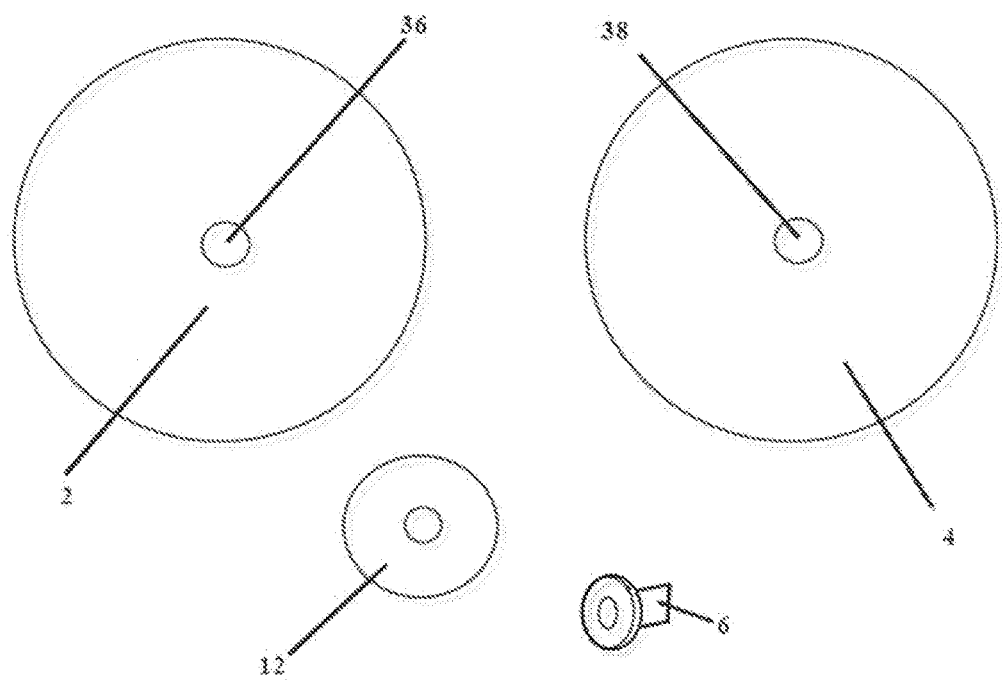
FIG. 2 is an exemplary device disclosed herein in uncoupled configuration in one embodiment.
Figure 3:
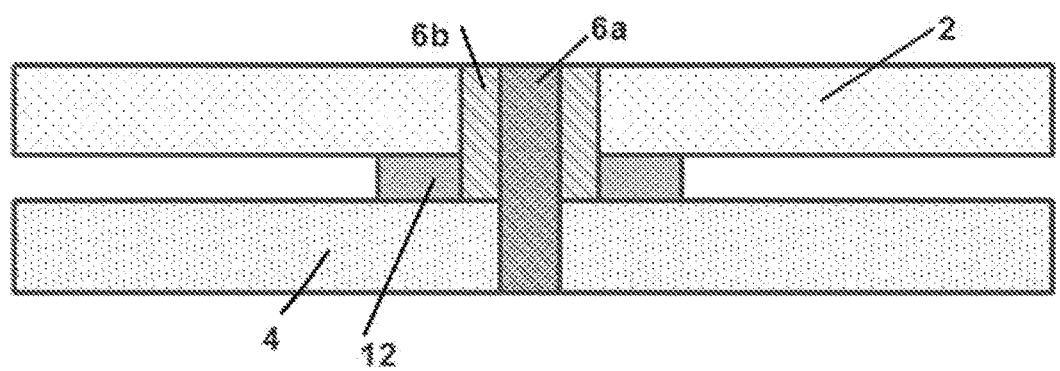
FIG. 3 is a side view of an exemplary device in one embodiment.
Figure 5:
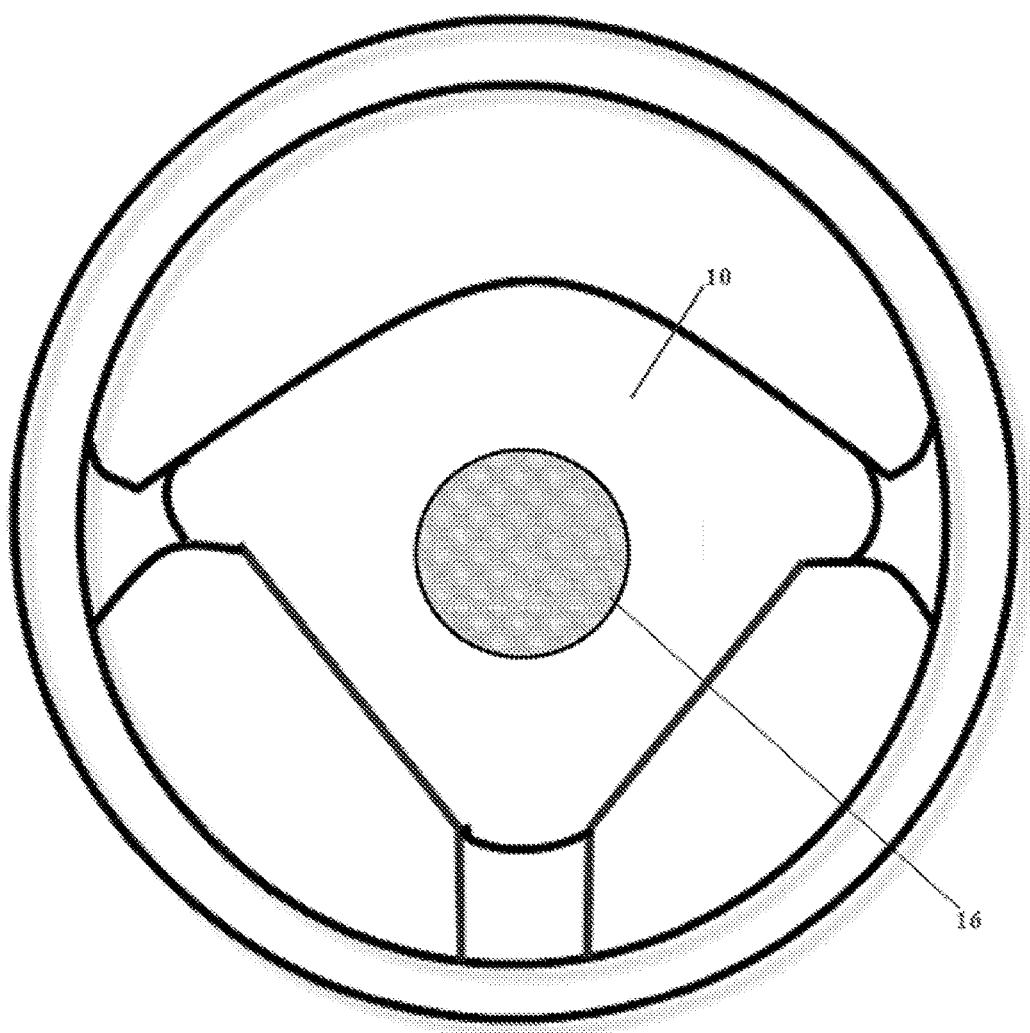
FIG. 5 is an exemplary attachment member coupled with a selected substrate in one embodiment.
Figure 6:
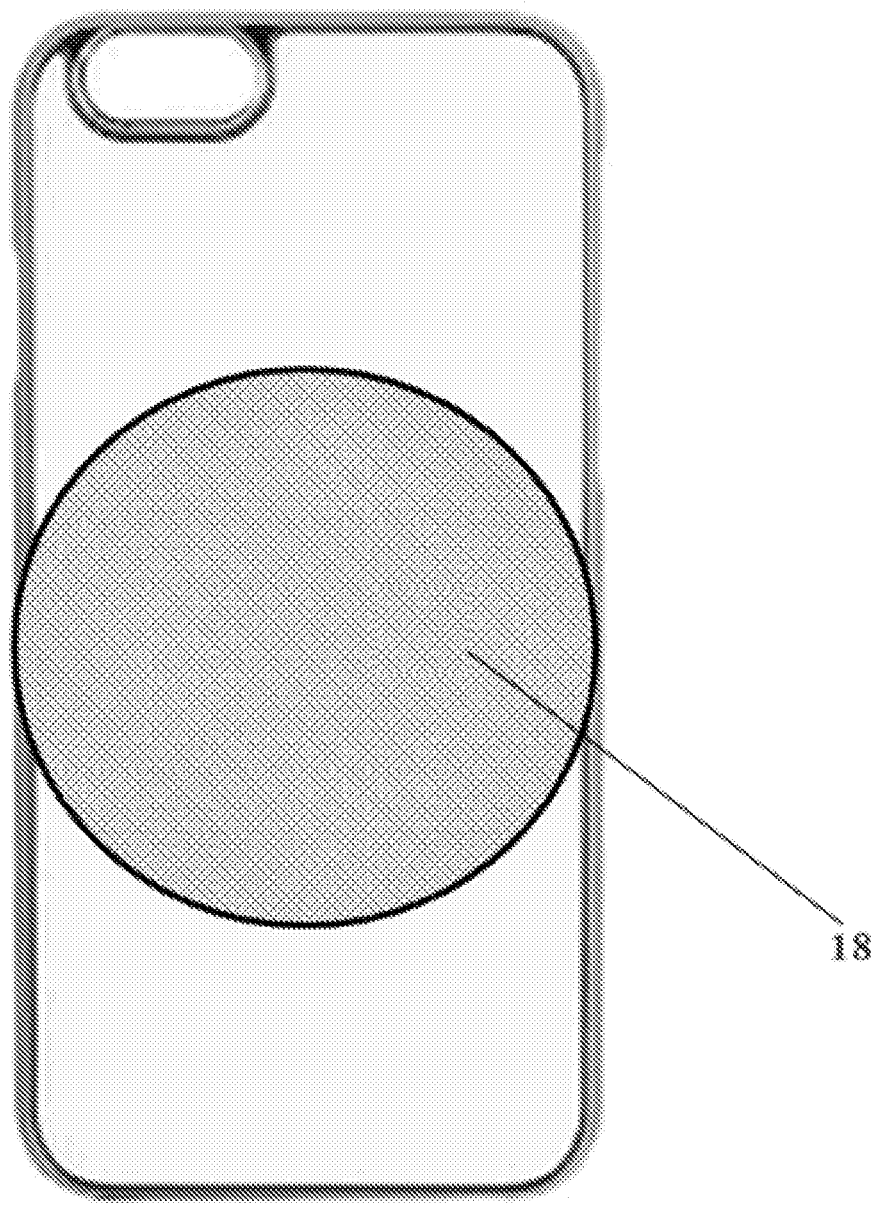
FIG. 6 is an exemplary attachment member coupled with a hand-held device in one embodiment.
Figure 7:
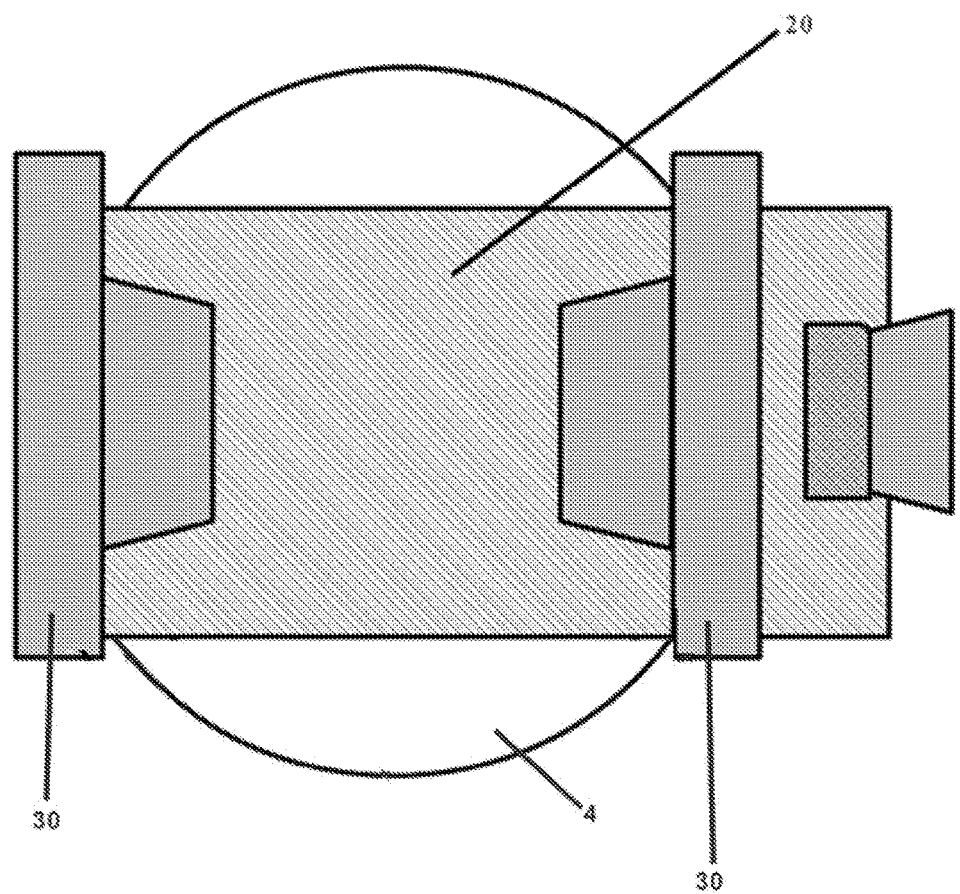
FIG. 7 is a front view of the one embodiment of the device disclosed herein.

FIG. 2 shows a disassembled hand-held device comprising the hand-held device mounting member 2, the fixation member 4 and parts of the fastener 6 and spacer 12. As depicted in the FIG. 2 and as readily understood by one of ordinary skill in the art, in this an exemplary device, the hand-held device mounting member and the fixation member can be used interchangeably. As it can further seen in FIG. 2, the hand held device mounting member can comprise a first bore 36, while the fixation member can comprise a second bore 38. FIG. 3 shows a side view of the hand-held device holder, where the hand-held device mounting member 2 is attached to the fixation member 4 with the fastener comprising a male 6a and a female 6b couplers optionally engaged with the spacer 12. It is further understood that the fastener is positioned in the first and the second bores (36 and 38 respectively, demonstrated in FIG. 2). In some exemplary aspects, the selected substrate can comprise a third attachment member. For example, FIG. 5 shows the exemplary third attachment member 16, disposed on the selected substrate 10, such as a car steering wheel. In yet other exemplary aspects, a hand-held device can comprise a fourth attachment member configured to be in coupling position with the first attachment member disposed on the hand-held device mounting member. FIG. 6 depicts the exemplary fourth attachment member 18. It is understood that while shown centered on the hand-held device, the third attachment member 18 may be positioned elsewhere, preferably including closer to the camera (not shown). Again, it is understood that the third attachment member can have any shape or size to ensure a proper attachment.

In yet another exemplary aspect, as shown in FIGS. 7-10, the hand-held device mounting member disclosed herein can further comprise: a housing 20 (FIG. 7) having a mounting surface 22 (FIG. 8), an opposed fixation member engaging surface 24 (FIG. 10), first and second side surfaces 26 (FIG. 8) or 28 (FIG. 10) (only one side surface is shown on each figure) connected to and extending therebetween the mounting surface and the fixation member engaging surface, a first and second support arms 30 (FIG. 7-9) connected to and extending therebetween the mounting surface, wherein the mounting surface, the first support arm, and at least a portion of the first and second side surfaces cooperate to form a first sliding member, the second support arm and a remaining portion of the first and second side surfaces cooperate to form a second sliding member, wherein the first and the second sliding members are configured to side in opposition to each other relative to a translation axis toward an open position, and wherein the first and the second sliding members are biased toward a closed position; wherein the support arms and the mounting surface cooperate to define a receiving area, and wherein the support arms are configured to securely engage a hand-held device positioned within the receiving area; and a fixation member 4 (FIGS. 7, 9, and 10), configured for an attachment to the selected substrate and wherein the housing is rotatably coupled to the fixation member so that a hand-held device remains in original position regardless of position of the selected substrate. In yet other aspects, the hand-held device mounting member is capable of keeping its original vertical position independent of position of the selected substrate.

Figure 8:
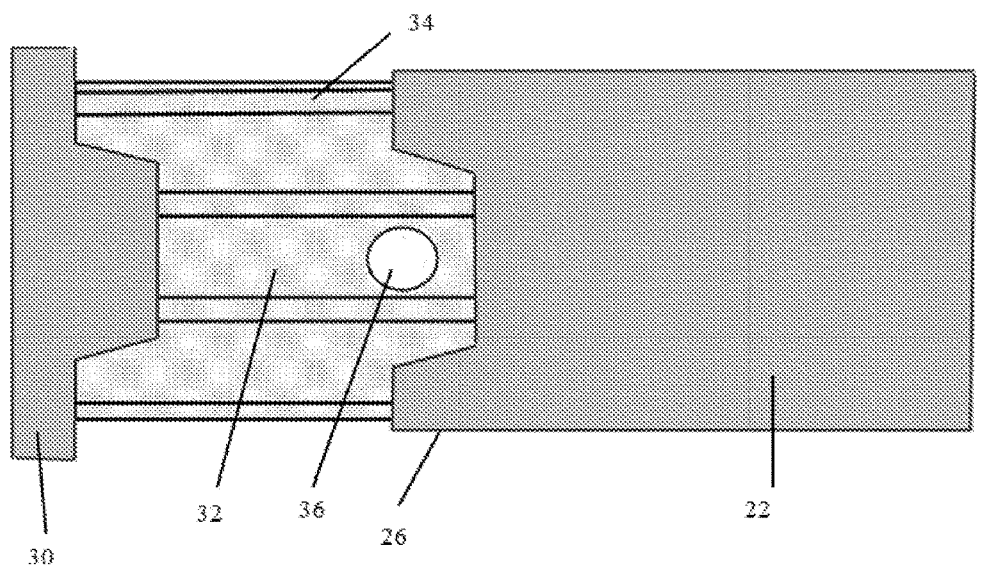
FIG. 8 is an exemplary housing in an open position of one embodiment.
Figure 9:
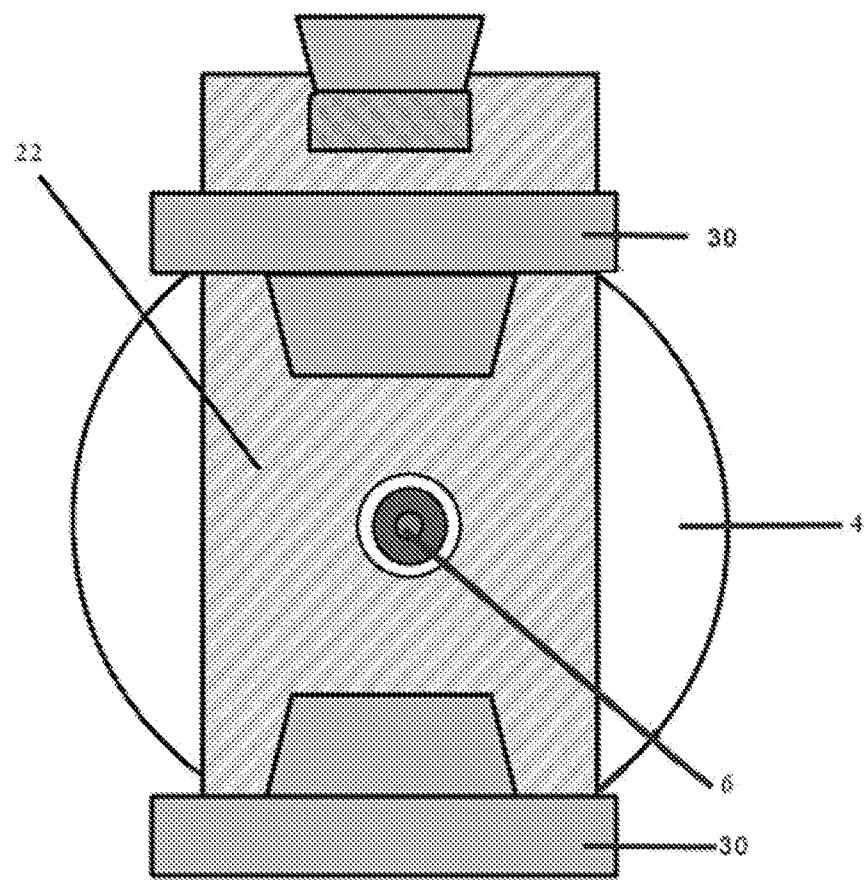
FIG. 9 is a front view of a housing coupled with a fixation member with a fastener of one embodiment.

It is understood that each of the mounting surface 22 (FIG. 8), the opposed fixation member engaging surface (not shown), and the first and second side surfaces 26 (FIG. 8) inherently define an interior portion. For example, as shown in FIG. 8 the opposed fixation member engaging surface and the second side surface define a first interior portion 32 and a second interior portion 34 respectively. In some aspects, at least a portion of the interior portion of the mounting surface, the opposed fixation member engaging surface, and the first and second side surfaces can define a space within the housing that can be observed only when the open position is formed by the first and the second sliding members. In certain aspects, the fixation member engaging surface defines a first bore 36 (FIG. 8) configured to receive the fastener. In some aspects, the space can be utilized to contain the fastener. In some aspects the fastener can be configured to extend through the first bore 36 in the opposed fixation engaging surface 24.

In certain aspects, the support arms and the sliding members cooperate to define a receiving distance of the housing. In some aspects, when the first and second sliding members are sliding in opposition to each other relative to a translation axis and perpendicular to the support arms toward the open position, the open position defines the receiving distance allowing the hand-held device to be fit therebetween the first and the second support arms. In some aspects, the receiving distance can be from about 3 inch to about 15 inch, including exemplary values of about 4 inch, about 5 inch, about 6 inch, about 7 inch, about 8 inch, about 9 inch, about 10 inch, about 11 inch, about 12 inch, about 13 inch, and about 14 inch. In some other aspects, the receiving distance of the housing is designed to receive substantially all currently known in the art hand-held devices.

In some aspects, the device can further comprise at least one spring engaging at least one sliding member in a biased position. In certain aspects, the at least one spring is disposed on the interior surface of the at least one sliding member. In some other aspects, the device comprises at least two springs engaging the first and the second sliding members in biased position. In yet other aspect, the at least two springs are disposed on the interior surface of the first and the second sliding members.

In some aspects, the receiving area of the hand-held device mounting member is capable of securely engaging the hand-held device having dimensions from 2 inch to about 10 inch in length and from 3 inch to about 15 inch in width, including exemplary value from about 3 inch, about 4 inch, about 5 inch, about 6 inch, about 7 inch, about 8 inch, and about 9 inch in length, and form about 4 inch, about 5 inch, about 6 inch, about 7 inch, about 8 inch, about 9 inch, about 10 inch, about 11 inch, about 12 inch, about 13 inch, and about 14 inch in width. It is further understood that according to the aspects of this disclosure, the hand-held device can comprise any hand-held device known in the art, for example and without limitation, a mobile phone, a smart phone, a tablet, a digital video disc (DVD) player, a radio transmitting device, a camera, a mapping reading device, a global positioning system (GPS) device, a mirror, a make-up case, an electronic reader, an electronic journal, and the like.

According to the aspects disclosed herein, the hand-held device mounting member and the fixation members can be made from any materials known in the art and exhibiting the desired properties. In some aspects, the hand-held device mounting member and the fixation members can be made from the same or the different materials. In yet other aspects, the hand-held device mounting member and the fixation members are made from a plastic material. In other aspects, the hand-held device mounting member and the fixation members are made from a metallic material. In some other aspects, the hand-held device mounting member and the fixation members can comprise a plastic material, a metallic material, wood, a glass, or a composite combination thereof.

In certain aspects, the housing disclosed herein can also be made from any material known in the art and exhibiting the desired properties. In certain aspects, the housing is made from a plastic material. In other aspects, the housing is made from a metallic material. In some other aspects, the housing maybe formed from a plastic material, a metallic material, wood, glass, or a composite combination thereof.

In some aspects, the hand-held device mounting member and/or the fixation members can further comprise a "skin" covering made from a fabric, an elastic resin, or a combination thereof. In some aspects, the fabric can be woven and non-woven. In other aspects, the fabric can comprise natural and synthetic fibers. In yet other aspects, the fabric, the elastic resin or a combination thereof are flame and arc resistant. It is understood that in some aspects, the fabric, the elastic resin or a combination thereof can help prevent unnecessary abrasion and friction of the hand-held. In yet other aspects, it is understood that the hand-held device mounting member and/or the fixation members may comprise a decorative or aesthetic feature. It is understood that the decorative or aesthetic feature can be any decorative or aesthetic feature known in the art. In some other aspects, the hand-held device mounting member and/or the fixation member further comprises an exchangeable decoration or aesthetic pattern, or a "skin covering." In some aspects, the exchangeable decoration or aesthetic pattern can be applied by any methods known in the art. In some aspects, the exchangeable decoration or aesthetic pattern can be applied with an adhesive. In some aspects, the decorative or aesthetic feature can be a sticker. In some aspect, the decorative or aesthetic feature can be in a form of writing. It is understood that if writing is present as a decorative or aesthetic feature, any possible fonts and languages can be utilized. It is further understood that in certain aspects, the decorative or aesthetic feature can be in a form of logo, trademark, or any combination thereof. In still further aspects, the decorative or aesthetic feature can be printed, engraved, or attached with any known attachment means. In yet other aspects, the decorative or aesthetic feature can be any decal known in the art. In still further aspects, the decorative or aesthetic feature can be permanent. In some aspects, the hand-held device mounting member and/or the fixation member can be colored. In other aspects, the housing can be colored. It is understood that the one of ordinary skill in the art depending the desirable design can easily choose the color of the hand-held device mounting member, and/or the housing, and/or the fixation member.

The first support arm of the exemplary device comprising a housing, can project from the first sliding member relative to an axis that is substantially perpendicular to the translation axis. Further, the second support arm can project from the second sliding member relative to an axis that is substantially perpendicular to the translation axis. In some aspects the support arms are angled relatively to the translation axis, as for example, demonstrated in FIG. 7-10. It is understood that the exact angle degree of the at least one of the second ends of each of the first and the second support arms can be determined by a desired grip of the support arms on the hand-held device.

The at least one of the support arms of the housing can further comprise a material reducing an abrasion and friction of the hand-held device. In some aspects, the material reducing the abrasion of the hand-held device can be disposed on an inner portion of the at least one of the support arms. It is understood that the material reducing the abrasion of the hand-held device can be made of any materials known in the art that prevent friction and abrasion. In some aspects, the material reducing the abrasion and the friction of the hand-held device is made from a resin, or a fabric, or a combination thereof. In some other aspects, the rubberized material, or gripping material can be utilized.

The hand-held device mounting member described herein can be configured for rotation relative to a rotational axis that is substantially perpendicular to the transitional axis. It is further understood that hand-held device mounting member is configured for uninterrupted rotation with minimized friction. It is further understood that aspects describing the hand-held device mounting member also comprise the aspects where the housing is present. In some aspects, the rotation of the housing determines position of the hand-held device relatively to position of the selected substrate.

In some aspects, the selected substrate is rigid. In other aspects, the selected substrate is rotatable. In these aspects, the rotation of the hand-held device mounting member is independent of the rotation of the selected substrate. In one exemplary aspect, the rotation of the housing is in the same direction as the rotation of the selected substrate. In another exemplary aspect, the rotation of the hand-held device mounting member is in the opposite direction to the rotation of the selected substrate.

It is understood that the hand-held device comprises a top portion, a middle portion and a bottom portion. The disclosed device allows the hand-held device to be always secured in the original position regardless the position of the selected surface. In some aspects, where the hand-held device mounting member comprises the housing, the hand-held device can be positioned as such that the top portion of the hand-held device is secured in the receiving area, and the middle and bottom portions of the hand-held device are not in engaged with the receiving area. It is further understood that in the aspects, wherein the hand-held device mounting surface does not comprise the housing, the hand-held device can be disposed in any position chosen by one of ordinary skill in the art to ensure that the hand-held device stays in the original position regardless position of the selected surface.

As it can be readily understood by one of ordinary skill in the art, some of the modern hand-held devices can comprise functionality buttons disposed on sides of the hand-held device. To ensure uninterrupted operation of the hand-held device, at least one of the support arms of the housing can further comprise an opening allowing an access to at least one functionality located on a side surface of a hand-held device. As one of ordinary skill in the art would readily appreciate, functionality buttons, such as, volume and display control, a device "on/off" switch can be positioned on the side surfaces of the hand-held device. According to the aspects of this disclosure, the inventive device ensures an easy access to the functionality buttons and easy operation control. It is further understood that the support arms are not in engagement with the at least one of the functionality button is present on the side surfaces of the hand-held device.

According to the aspects of this disclosure, where the hand-held device mounting member comprises the housing, the fixation member configured for an attachment to a selected substrate can have any shape allowing rotatable coupling with the housing. In some exemplary aspects, the fixation member is an annular member. In still further exemplary aspects, the fixation member is a circular member. In other exemplary aspects, the fixation member is a triangular member. In yet other aspects, the fixation member can be, for example and without limitation of rhombic, square, parallelogram, trapezoid, or irregular form member.

In certain aspects, the fixation member and the hand-held device mounting member and/or the housing have at least one point of contact. In yet other aspects, the fixation member and the hand-held device mounting member and/or and the housing have only one point of contact. In certain aspects, the rotatably coupling of the fixation member and the hand-held device mounting member and/or the housing are substantially friction free.

As described the hand-held device mounting member and/or the housing can be coupled to the fixation member by a fastener 6 (FIG. 1, 4, 9-12). In some aspects, the fastener can be any fastener known in the art. In certain aspects, the fastener is a magnetic material. It is understood that in the aspects, where the fastener is a magnetic material, at least a portion of the fixation member and the fixation member engaging surface comprises a metallic material. In some other aspects, the fastener can comprise a male couple and a female coupler. In some other aspects, the male and female couplers can be in threaded engagement. In some other aspects, the male and female couplers are in magnetic engagement. In certain aspects, the fastener can include, for example and without limitation a bolt, a socket, a rod, a stud, a screw, an anchor, a rivet lock bolt, a nut, a rivet nut, a rivet collar, a self-clinching nut, a washer, a river nut washer, and the like. In some aspects, the fastener may comprise a bolt. In another aspect, the fastener may comprise a nut. In some other aspects, a spacer may optionally present to allow substantially friction free rotation of the hand-held device mounting member and/or housing and the fixation member. It is understood that the fastener may be made of any material known in the art and acceptable for a desired application. In some aspects, the fastener is made of metal. In another aspect, the fastener is made of plastic.

In some aspects the fastener is positioned in the center of the device. In another aspect, the fastener is positioned perpendicular to the translation axis and in parallel to the second axis. In certain aspects, the fastener is positioned in a center of mass of the disclosed device.

In some aspects, the hand-held device mounting member defines a first bore 36 (FIG. 2). In yet other aspects, the fixation member engaging surface of the housing can define a first bore 36 (FIG. 8) configured to receive the fastener. In certain aspects, the size of the first bore can be easily defined by one of ordinary skill in the art depending on the size of the fastener. In some aspects, the first bore is located in a center of the fixation member engaging surface. In another aspect, the first bore (For example, 36, FIG. 8) is extending into the space formed by the interior portions of the fixation member engaging surface, the mounting surface, and the first and second side surfaces. In some aspects, the fastener is positioned in the first bore. In exemplary aspect, a male coupler of the fastener is positioned in the first bore. In yet another aspect, a proximal end of the male coupler extends into the space formed by the interior portions of the fixation member engaging surface, the mounting surface, and the first and second side surfaces. In yet other aspects, the male coupler is selectively adapted of selective movement of a distal end of the male coupler relative to an outer portion of the fixation member engaging surface to permit engagement with a female coupler.

In some aspects, the fixation member defines a second bore 38 (FIG. 2) and wherein the second bore being configured to receive the fastener. In certain aspects, the size of the second bore can be easily defined by one of ordinary skill in the art depending on the size of the fastener. In some aspects, the size of the first and the second bore are identical. In other aspects, the size of the first bore is larger than the size of the second bore. In yet other aspects, the size of the first bore is smaller than the size of the second bore. In some aspects, the second bore is located in a center of the fixation member. In yet other aspects, the second bore is located anywhere on the fixation member to allow rotatably coupling between the housing and the fixation member. In certain aspects, the fastener is positioned in the second bore. In yet other aspects, a female coupler of the fastener is positioned in the second bore. In some aspects, a distal end of the female coupler is extending towards the first bore. In other aspects, a male coupler is posited inside the female coupler once the first bore has received the female coupler. In yet other aspects, the female coupler 6b (FIG. 3) is positioned onto the male coupler 6a (FIG. 3) once the second bore has received the male coupler. In yet further aspects, the female and male fasteners are in threaded engagement. It is further understood that the position of the male and female couplers can be reversed without any effect on the device performance. In some aspects, the female coupler can be positioned in the first bore. In other aspects, the male coupler can be positioned in the second bore.

Figure 10:
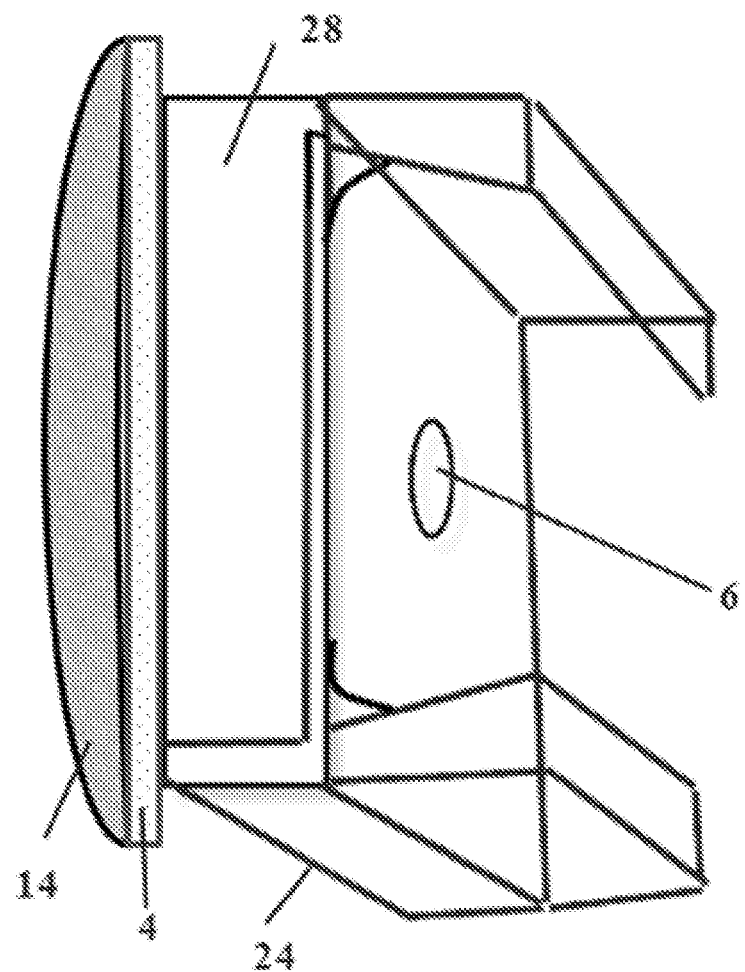
FIG. 10 is a side view of a housing coupled with a fixation member with a fastener of one embodiment.
Figure 11:
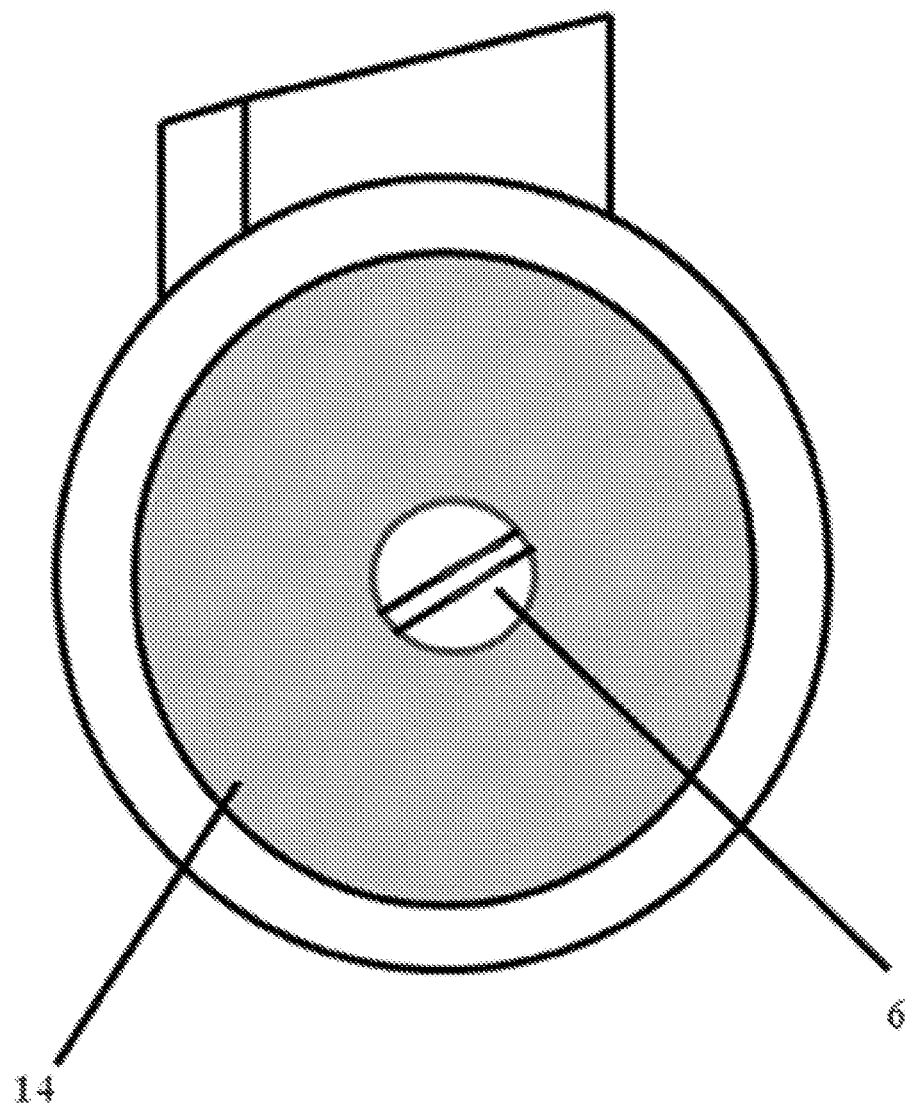
FIG. 11 is a back view of a housing coupled with a fixation member with a fastener of one embodiment.
Figure 13:
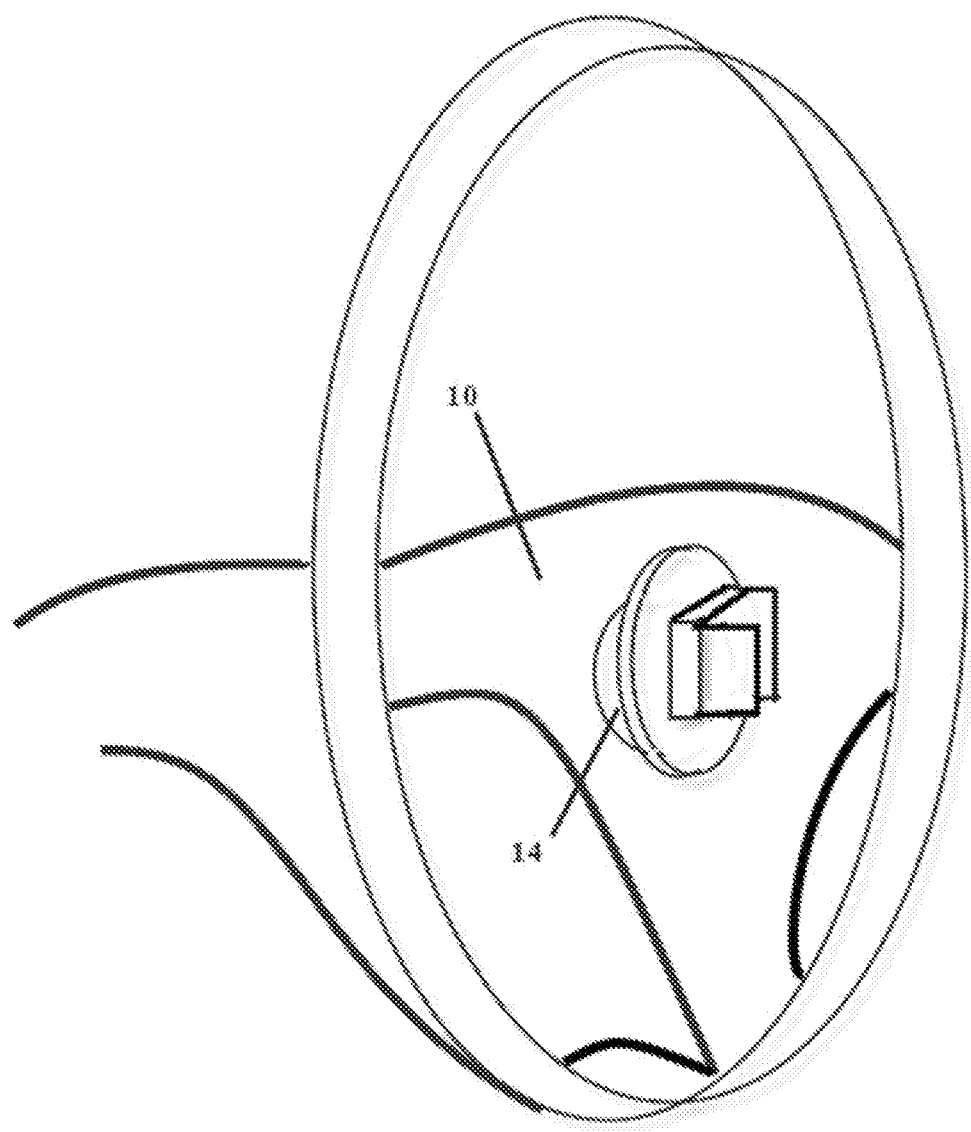
FIG. 13 is a side view of the device mounted of a selected substrate of one embodiment.

The exemplary device can further comprise a third attachment member for an attachment to the selected substrate (FIG. 4, FIG. 10; FIG. 11; FIG. 13). In some aspects, the attachment member is disposed on a fourth surface of the fixation member that is opposite to the third surface of the fixation member facing the fixation member engagement surface of the housing or the second surface of the hand-held device mounting member. In some aspects, the attachment member can be permanently attached to the fixation member. In other aspects, the attachment member is in a removable engagement with the back surface of the fixation member. It is understood that any attachment members described herein can be used. In some exemplary aspects of this disclosure, the attachment member can be purchased from Textol System Inc, for example Velcro®, Loop #1000 HOOK#88 ADHESIVE #0172. In yet other aspects, the attachment member can comprise any adhesive material allowing an attachment with the selected substrate.

In some aspects, a third attachment member 18 can be disposed on the selected substrate 10 (FIG. 5). It is understood that the third attachment member can be any attachment member disclosed herein.

Figure 12:
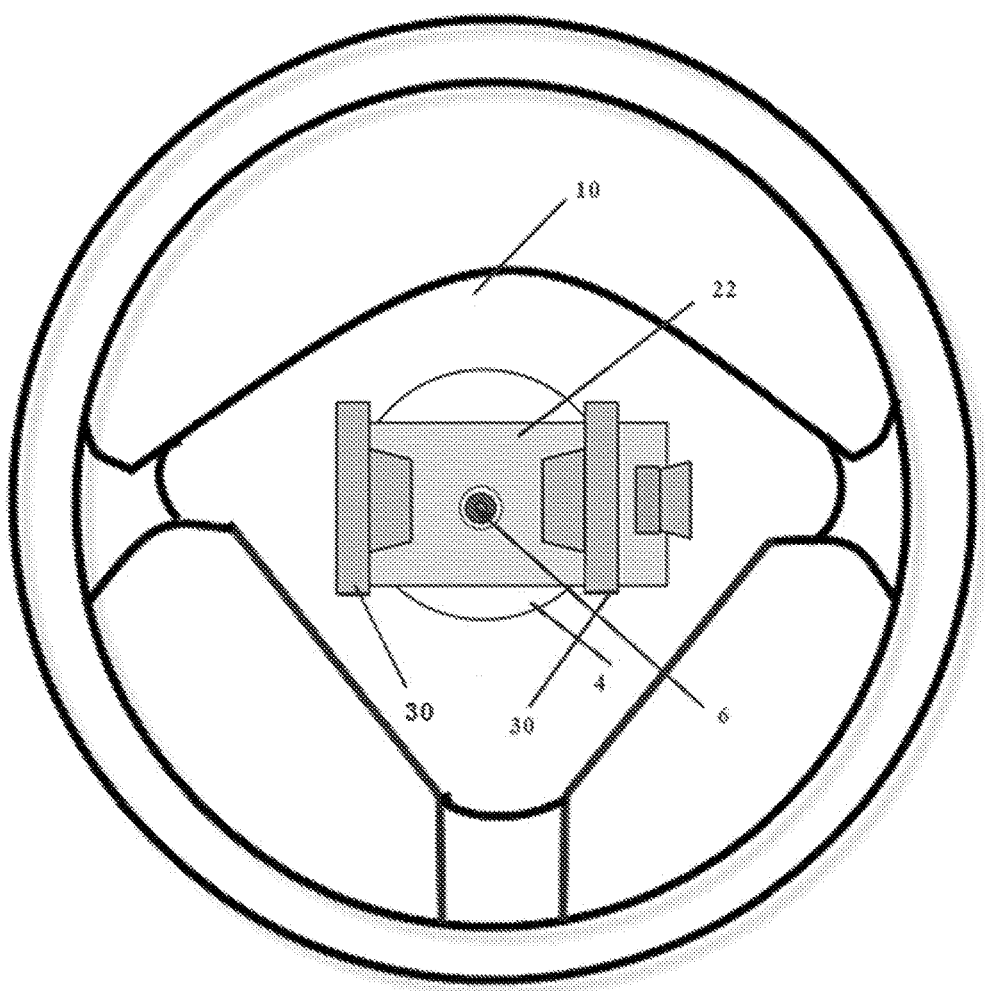
FIG. 12 is a front view of the device mounted on a selected substrate of one embodiment.

In some aspects, the selected substrate can be mobile or stationary. As defined herein the stationary substrate comprises any substrate that is present in a fixed position. It is understood that the stationary substrate is present in a fixed position regardless of the surrounding environment. For example, and without limitation a dashboard, a mirror, a sun visor, or a window are contemplated to be stationary devices that are fixed in a specific position regardless movement of a vehicle of which they are a part. In certain aspects, the selected substrate is mobile. In yet other aspects, a steering wheel is considered to be a mobile substrate since its position changes as a result of surrounding environment. According to the aspects of this disclosure, the selected substrate can comprise a steering wheel, a dashboard, a windshield, a window, a mirror, a sun visor, or any combinations thereof. In some aspects, the selected substrate 10 is a steering wheel (FIG. 1, FIG. 12, and FIG. 13). In the aspects, where the selected substrate is a steering wheel, the receiving member is preferably positioned in the center of a steering wheel. In other aspects, where the selected substrate is the steering wheel, the receiving member is not positioned on the rim of the steering wheel.

In some aspects, when the device is coupled with the selected substrate, the hand-held device mounting member and/or housing of the device can rotate relative to the selected substrate. It is further understood that the rotation of the device is independent of rotation of the selected substrate, if mobile. In some aspects, the hand-held device secured on the hand-held device mounting member or within the housing can be in rotatably engagement with the selected surface. It is further understood that the hand-held device secured on the hand-held device mounting member or within the housing can rotate in the same direction, or in opposite direction relative to the rotation of the selected substrate, if mobile. In some aspects, the hand-held device secured on the hand-held device mounting member or within the housing remains in its original vertical position independent of position of the selected substrate.

In certain aspects, the device disclosed herein and coupled with the selected substrate allows continuous charging of the hand-held device. For example, the hand-held device couples with the selected substrate can also be connected to any electric output present in a vehicle and configured to charge the hand-held device.

In some aspects, the use of the device disclosed herein, allows the driver to operate the vehicle without the need to turn his or her head in any direction to locate or use the hand-held device. In other aspects, the use of the device disclosed herein allows the driver to interact with the hand-held device while continuing to look forward and viewing the central and periphery of the road. The device disclosed herein is readily accessible and no effort is needed to hold it for dialing and/or answering. It is the closest distance and in direct alignment with the phone while being secured in the car for use of conversing with the hand-held device speaker at "ON" position, in which provides clear sound with respect to driver's direct and close position to the hand-held device.

Figure 14:
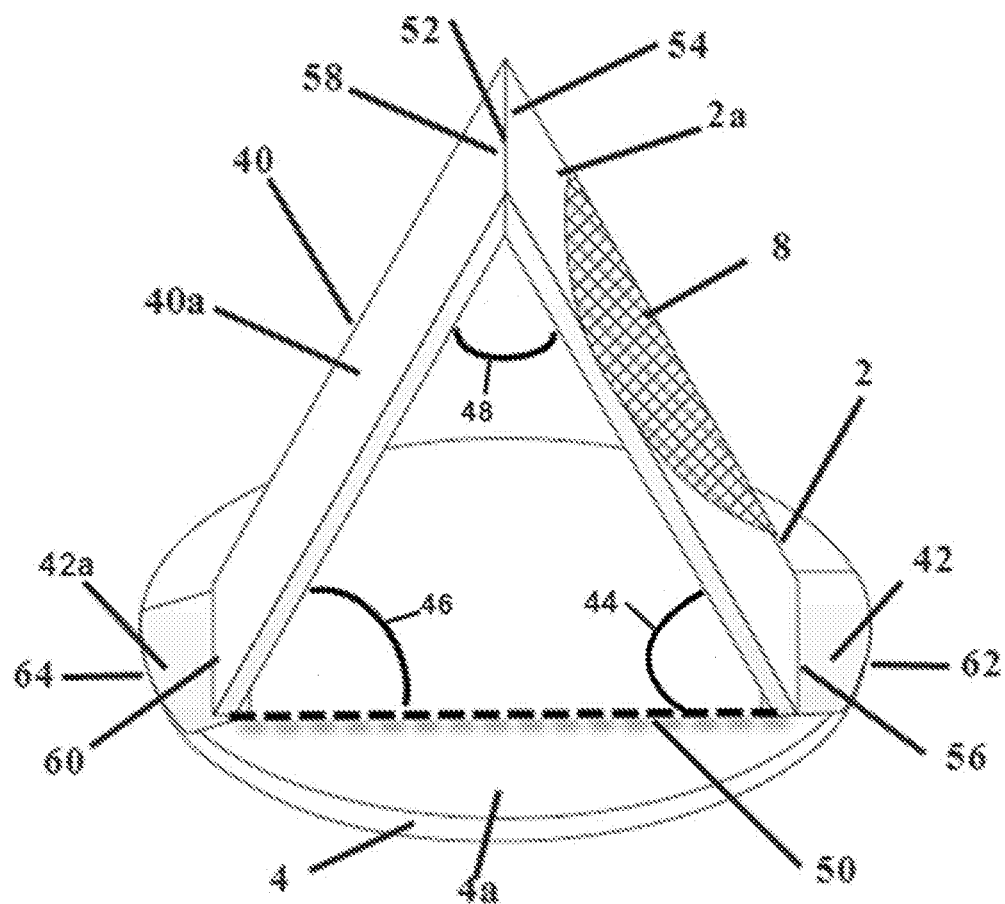
FIG. 14 is a side view of an exemplary device of one embodiment.

In certain aspects, disclosed herein is also a device for mounting a hand-held device to a substrate, as shown in FIG. 14, for example. The device comprises: a hand-held device mounting member comprising a first surface, a second surface, a first proximal end and a first distal end wherein the first surface is opposite to the second surface; a support member comprising a third surface, a fourth surface, a second proximal end and a second distal end; wherein the third surface is opposite to the fourth surface; a fixation member comprising a fifth surface, a sixth surface, a first end and a second end; and wherein the fifth surface is opposite to the sixth surface; wherein a portion of the first proximal end of the hand-held device mounting member is configured to hingeably couple with a portion of the first end of the fixation member; wherein a portion of the second proximal end of the support member is configured to hingeably couple with a portion of the second end of the fixation member, wherein the first and the second end of the fixation member are opposite to each other; wherein the second surface of the a hand-held device mounting member and the fifth surface of the fixation member cooperate to define a first angle, and wherein the first angle is selectively adjustable; wherein the fourth surface of the support member and the fifth surface of the fixation member cooperate to define a second angle, and wherein the second angle is selectively adjustable; wherein a portion the first distal end of the hand-held device mounting member is configured to hingeably couple with a portion of the second distal end of the support member; wherein the second surface of the hand-held device mounting member and the fourth surface of the support member cooperate to define a third angle, and wherein the third angle is selectively adjustable; wherein the first surface of the hand-held device mounting member is configured to receive a hand-held device; wherein the sixth surface of the fixation member is configured to be attached to a selected substrate; and wherein the hand-held device mounting member and the support member have at least one point of contact.

It is understood that the fixation member can have any shape described herein. It is further understood that the fixation member can be made of any material described herein.

In some aspects, the shape of the hand-held device mounting member and the support member can be the same or different. In some aspects, the hand-held device and/or the support member can have any shape. In some aspects, the hand-held device and/or the support member can have, for example, and without limitation, an annular, a circular, a triangular, a rhombic, a square, a parallelogram, a trapezoidal, irregular, or any other shape. In yet further aspects, the hand-held device and the support member can be used interchangeably.

In still further aspects, the hand-held device mounting member, the support member, and/or fixation member can be made of any suitable materials described herein. In some aspects, the hand-held device mounting member, the support member, and/or the fixation members can be made from the same or the different materials. In yet other aspects, the hand-held device mounting member, the support member, and/or the fixation members are made from a plastic material. In other aspects, the hand-held device mounting member, the support member, and/or the fixation members are made from a metallic material. In some other aspects, the hand-held device mounting member, the support member, and/or the fixation members can comprise a plastic material, a metallic material, wood, glass, or a combination thereof.

In some aspects, the hand-held device can be attached to the hand-held device mounting member by a first attachment member. In other aspects, the fixation member can be attached to a selected substrate by a second attachment member.

In certain aspects, the selected substrate can be any substrate described herein. In still further aspects, the selected substrate is a stationary substrate. In still further aspects, the selected substrate is a substrate selected from the group consisting of a window, a dashboard, a sun visor, or a mirror.

An exemplary device of another embodiment is shown on FIG. 14. The exemplary device has a hand-held device mounting member 2 comprising a first surface 2a and a second surface opposite to the first surface (not shown). The support member 40 of the device comprises a third surface 40a and a fourth surface opposite to the third surface (not shown). The fixation member 4 of the device comprises a fifth surface 4a and a sixth surface opposite to the fifth surface (not shown). The hand-held device mounting member and the support member can have at least one point of contact 52. In certain aspects, the at least one point of contact can be positioned anywhere on the hand-held device mounting member and the support member. It is understood that the at least one point of contact can be easily adjusted and chosen by one of ordinary skill in the art. In some aspects, the hand-held device mounting member has a first proximal end 56 and a first distal end 54. In yet other aspects, the support member has a second proximal end 60 and a second distal end 58. It is understood that a portion of the first proximal end 56 of the hand-held device mounting member can be configured to be hingeably coupled with a portion of the first end 62 of the fixation member. To allow the portion of the first proximal end 56 of the hand-held device mounting member to be hingeably coupled with the portion of the first end 62 of the fixation member, the fixation member can comprise a first socket 42. Further, apportion of the second proximal end 60 of the support member can be configured to be hingeably coupled with a portion of the second end 64 of the fixation member. To allow the portion of the second proximal end 60 of the hand-held device mounting member to be hingeably coupled with the portion of the second end 64 of the fixation member, the fixation member can further comprise a second socket 42a. It is further understood that the first socket 42 and the second socket 42a can be same or different.

The second surface (not shown) of the hand-held device mounting member and the fifth surface 4a of the fixation member 4 (as defined by an imaginary line 50) cooperate to define a first angle 44. The first angle 44 can be selectively adjusted by allowing the hand-held device mounting member to hingeably move in the socket 42 to arrive at any desirable angle. The fourth surface (not shown) of the support member 40 and the fifth surface 4a of the fixation member 4 (as defined by an imaginary line 50) cooperate to define a second angle 46. The second angle 46 can also be selectively adjustable. The second angle 46 can be adjusted by allowing the supporting member to hingeably move in the socket 42a to arrive at any desirable angle.

A portion the first distal end 54 of the hand-held device mounting member is configured to hingeably couple with a portion of the second distal end 58 of the support member. It is further understood that the second surface of the hand-held device mounting member and the fourth surface of the support member can cooperate to define a third angle 48. This third angle 48 is also selectively adjustable by changing the position of the hand-held device mounting member and the support member. It is further understood that the first angle 44, the second angle 46 and the third angle 48 can be same or different. It is further understood that each of these angles can have value that gives a desirable result.

It is further understood that the first surface 2a of the hand-held device mounting member 2 is configured to receive a hand-held device by means of the first attachment member 8, wherein the first attachment member can be any attachment member described herein. The sixth surface of the fixation member (not shown) is configured to be attached to a selected substrate by means of the second attachment member (not shown), wherein the second attachment member can be any member disclosed herein.

C. Methods

Also disclosed herein is a method comprising: coupling a hand-held device mounting member with a fixation member to allow the hand-held device mounting member and the fixation member to engage in rotatably configuration; attaching the fixation member with a second attachment member to a selected substrate; and mounting a hand-held device on the hand-held device mounting member, wherein a hand-held device is oriented in its original position independent of position of the selected substrate.

The hand-held device mounting member disclosed herein can further comprise a housing having a mounting surface, an opposed fixation member engaging surface, a first and a second side surface connected to and extending therebetween the mounting surface and the fixation member engaging surface, a first and a second support arm connected to and extending therebetween the mounting surface, wherein the mounting surface, the first support arm, and at least a portion of the first and second side surfaces cooperate to form a first sliding member, the second support arm and a remaining portion of the first and second side surfaces cooperate to form a second sliding member, wherein the first and the second sliding members are configured to side in opposition to each other relative to a translation axis toward an open position, and wherein the first and the second sliding members are biased toward a closed position; wherein the support arms and the mounting surface cooperate to define a receiving area, and wherein the support arms are configured to securely engage a hand-held device positioned within the receiving area.

It is further disclosed herein a method of using the disclosed device for mounting a hand-held device comprising: attaching the hand-held mounting device to a steering wheel; mounting a hand-held device; and utilizing the hand-held device during driving in hands free mode.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

In view of the described devices for mounting a hand-held device and methods of using such devices, herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A device for mounting a hand-held device to a selected substrate comprising: a hand-held device mounting member comprising a first surface and a second surface; a fixation member comprising a third surface and a fourth surface; and a fastener; wherein the second surface of the hand-held device mounting member is engagable with the third surface of the fixation member; wherein the fourth surface of the fixation member is configured to mount on the selected substrate; and wherein the hand-held device mounting member is configured to be rotatably coupled with the fixation member by the fastener so that a hand-held device remains in an original position regardless of position of the selected substrate.

Aspect 2: The device of Aspect 1, further comprising a first attachment member and a second attachment member.

Aspect 3: The device of Aspect 2, wherein the first attachment member is disposed on the first surface of the hand-held device mounting member; and wherein the first attachment member is configured for attachment of a hand-held device.

Aspect 4: The device of Aspect 2, wherein the second attachment member IS disposed on the fourth surface of the fixation member; and wherein the second attachment member is configured for attachment to the selected substrate.

Aspect 5: The device of Aspect 1, wherein the hand-held device mounting member and the fixation member are spaced to provide substantially friction free rotation.

Aspect 6: The device of Aspect 1, wherein the hand-held device mounting member further comprises: a housing having a mounting surface, an opposed fixation member engaging surface, a first side surface and a second side surface connected to and extending therebetween the mounting surface and the fixation member engaging surface, a first support arm and a second support arm connected to and extending therebetween the mounting surface; wherein the mounting surface, the first support arm, and at least a portion of the first and second side surfaces cooperate to form a first sliding member, the second support arm and a remaining portion of the first and second side surfaces cooperate to form a second sliding member, wherein the first and the second sliding members are configured to slide in opposition to each other relative to a translation axis toward an open position, and wherein the first and the second sliding members are biased toward a closed position; and wherein the support arms and the mounting surface of the housing cooperate to define a receiving area, and wherein the support arms are configured to securely engage a hand-held device positioned within the receiving area.

Aspect 7: The device of Aspect 6, wherein the first support arm projects from the first sliding member relative to a second axis that is substantially perpendicular to the translation axis.

Aspect 8: The device of Aspect 6, wherein the second support arm projects from the second sliding member relative to a second axis that is substantially perpendicular to the translation axis.

Aspect 9: The device of Aspect 6, wherein the housing is configured for rotation relative to a rotational axis that is substantially perpendicular to the transitional axis and is substantially parallel to a second axis.

Aspect 10: The device of Aspect 6, wherein the housing is rotatably coupled with the fixation member by the fastener so that a hand-held device remains in the original position regardless of position of the selected substrate.

Aspect 11: The device of Aspect 6, wherein the housing further comprises at least one spring engaging at least one sliding member in a biased position.

Aspect 12: The device of Aspect 11, wherein the at least one spring is disposed on the interior surface of the at least one sliding member.

Aspect 13: The device of Aspect 1, wherein the hand-held device mounting member defines a first bore configured to receive the fastener.

Aspect 14: The device of Aspect 13, wherein the fixation member engaging surface defines a second bore configured to receive the fastener.

Aspect 15: The device of Aspect 1, wherein the fastener comprises a male coupler and a female coupler.

Aspect 16: The device of Aspect 15, wherein the make coupler is positioned in the first bore.

Aspect 17: The device of Aspect 15, wherein the female coupler is positioned in the second bore.

Aspect 18: The device of Aspect 15, wherein the male coupler is selectively adapted for selective movement of a distal end of the male coupler relative to an outer portion of the hand-held device mounting member to permit engagement with the female coupler.

Aspect 19: The device of Aspect 15, wherein the female coupler is positioned onto the male coupler once the second bore has received the male coupler.

Aspect 20: The device of Aspect 15, wherein the male coupler and the female coupler are in threaded engagement.

Aspect 21: The device of Aspect 1, wherein the selected substrate is mobile.

Aspect 22: The device of Aspect 21, wherein the selected substrate is rotatable.

Aspect 23: The device of Aspect 21, wherein the selected substrate is a substrate selected from the group consisting of a steering wheel, a dashboard, a windshield, a mirror, a window, a sun visor, or any combinations thereof.

Aspect 24: The device of Aspect 1, wherein the device is capable of receiving a hand-held device having dimensions from 2 inches to about 10 inches in length and from 3 inches to about 15 inches in width.

Aspect 25: The device of Aspect 6, wherein at least one of the support arms has an opening allowing operation of at least one functionality located on a side surface of a hand-held device.

Aspect 26: A method comprising: coupling a hand-held device mounting member with a fixation member to allow the hand-held device mounting member and the fixation member to engage in a rotatable configuration; attaching the fixation member with a second attachment member to a selected substrate; and mounting a hand-held device on the hand-held device mounting member, wherein the hand-held device is oriented in its original position independent of position of the selected substrate.

Aspect 27: The method of Aspect 26, wherein the hand-held device mounting member further comprises a housing having a mounting surface, an opposed fixation member engaging surface, a first side surface and a second side surface connected to and extending therebetween the mounting surface and the fixation member engaging surface, a first support arm and a second support arm connected to and extending therebetween the mounting surface, wherein the mounting surface, the first support arm, and at least a portion of the first side and second side surfaces cooperate to form a first sliding member, the second support arm and a remaining portion of the first and second side surfaces cooperate to form a second sliding member, wherein the first and the second sliding members are configured to slide in opposition to each other relative to a translation axis toward an open position, and wherein the first and the second sliding members are biased toward a closed position; wherein the support arms and the mounting surface cooperate to define a receiving area, and wherein the support arms are configured to securely engage a hand-held device positioned within the receiving area.

Aspect 28: The method of Aspect 26, wherein the selected substrate is a steering wheel.

Aspect 29: A device for mounting a hand-held device to a substrate comprising: a hand-held device mounting member comprising a first surface, a second surface, a first proximal end and a first distal end; wherein the first surface is opposite to the second surface; a support member comprising a third surface, a fourth surface, a second proximal end and a second distal end; wherein the third surface is opposite to the fourth surface; a fixation member comprising a fifth surface, a sixth surface, a first end and a second end; and wherein the fifth surface is opposite to the sixth surface; wherein a portion of the first proximal end of the hand-held device mounting member is configured to hingeably couple with a portion of the first end of the fixation member; wherein a portion of the second proximal end of the support member is configured to hingeably couple with a portion of the second end of the fixation member, wherein the first and the second end of the fixation member are opposite to each other; wherein the second surface of the hand-held device mounting member and the fifth surface of the fixation member cooperate to define a first angle, and wherein the first angle is selectively adjustable; wherein the fourth surface of the support member and the fifth surface of the fixation member cooperate to define a second angle, and wherein the second angle is selectively adjustable; wherein a portion the first distal end of the hand-held device mounting member is configured to hingeably couple with a portion of the second distal end of the support member; wherein the second surface of the hand-held device mounting member and the fourth surface of the support member cooperate to define a third angle, and wherein the third angle is selectively adjustable; wherein the first surface of the hand-held device mounting member is configured to receive a hand-held device; wherein the sixth surface of the fixation member is configured to be attached to a selected substrate; and wherein the hand-held device mounting member and the support member have at least one point of contact.

Aspect 30: The device of Aspect 29, wherein the hand-held device mounting member is configured to receive a hand-held device.

Aspect 31: The device of Aspect 30, wherein the hand-held device mounting member is configured to attach a hand-held device by a first attachment member.

Aspect 32: The device of Aspect 29, wherein the fixation member is attachable to the selected substrate by a second attachment member.

Aspect 33: The device of Aspect 29, wherein the selected substrate is a stationary substrate.

What is claimed is:

1. A device for mounting a hand-held device to a selected substrate comprising:
    a hand-held device mounting member comprising a first surface and a second surface;
    a fixation member comprising a third surface and a fourth surface; and
    a fastener; wherein the fastener comprises a male coupler and a female couples, and wherein the male coupler is selectively adapted for selective movement of a distal end of the male coupler relative to an outer portion of the hand-held device mounting member to permit engagement with the female coupler;
    wherein the second surface of the hand-held device mounting member is engagable with the third surface of the fixation member;
    wherein the fourth surface of the fixation member is configured to mount on the selected substrate; and
    wherein the hand-held device mounting member is configured to be rotatably coupled with the fixation member by the fastener so that a hand-held device remains in an original position regardless of position of the selected substrate.

2. The device of claim 1, further comprising a first attachment member and a second attachment member.

3. The device of claim 2, wherein the first attachment member is disposed on the first surface of the hand-held device mounting member; and
    wherein the first attachment member is configured for attachment of a hand-held device.

4. The device of claim 2,
    wherein the second attachment member is disposed on the fourth surface of the fixation member; and
    wherein the second attachment member is configured for attachment to the selected substrate.

5. The device claim 1, wherein the hand-held device mounting member and the fixation member are spaced to provide substantially friction free rotation.

6. The device of claim 1, wherein the male coupler and the female coupler are in threaded engagement.

7. The device claim 1, wherein the selected substrate is mobile.

8. The device of claim 7, wherein the selected substrate is rotatable.

9. The device of claim 7, wherein the selected substrate is a substrate selected from the group consisting of a steering wheel, a dashboard, a windshield, a mirror, a window, a sun visor, or any combinations thereof.

10. The device of claim 1, wherein the device is capable of receiving a hand-held device having dimensions from 2 inches to about 10 inches in length and from 3 inches to about 15 inches in width.

11. A method comprising:
    mounting a hand-held device on the device of claim 1, wherein the hand-held device is oriented in its original position independent of position of the selected substrate.

12. The method of claim 11, wherein the selected substrate is a steering wheel.

13. A device for mounting a hand-held device to a substrate comprising:
    a hand-held device mounting member comprising a first surface, a second surface, a first proximal end and a first distal end; wherein the first surface is opposite to the second surface;
    a support member comprising a third surface, a fourth surface, a second proximal end and a second distal end; wherein the third surface is opposite to the fourth surface;
    a fixation member comprising a fifth surface, a sixth surface, a first end and a second end; and wherein the fifth surface is opposite to the sixth surface;
    wherein a portion of the first proximal end of the hand-held device mounting member is configured to hingeably couple with a portion of the first end of the fixation member;
    wherein a portion of the second proximal end of the support member is configured to hingeably couple with a portion of the second end of the fixation member, wherein the first and the second end of the fixation member are opposite to each other;

wherein the second surface of the hand-held device mounting member and the fifth surface of the fixation member cooperate to define a first angle, and wherein the first angle is selectively adjustable;

wherein the fourth surface of the support member and the fifth surface of the fixation member cooperate to define a second angle, and wherein the second angle is selectively adjustable;

wherein a portion the first distal end of the hand-held device mounting member is configured to hingeably couple with a portion of the second distal end of the support member;

wherein the second surface of the hand-held device mounting member and the fourth surface of the support member cooperate to define a third angle, and wherein the third angle is selectively adjustable;

wherein the first surface of the hand-held device mounting member is configured to receive a hand-held device;

wherein the sixth surface of the fixation member is configured to be attached to a selected substrate; and wherein the hand-held device mounting member and the support member have at least one point of contact.

14. The device of claim 13, wherein the hand-held device mounting member is configured to receive a hand-held device.

15. The device of claim 14, wherein the hand-held device mounting member is configured to attach a hand-held device by a first attachment member.

16. The device of claim 13, wherein the fixation member is attachable to the selected substrate by a second attachment member.

17. The device of claim 13, wherein the selected substrate is a stationary substrate.

* * * * *